(12) United States Patent
Laffoon et al.

(10) Patent No.: US 8,984,632 B1
(45) Date of Patent: Mar. 17, 2015

(54) SYSTEMS AND METHODS FOR IDENTIFYING MALWARE

(75) Inventors: Barry Laffoon, Glendale, CA (US); Abubakar Wawda, Cupertino, CA (US); Jun Mao, Culver City, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/619,978

(22) Filed: Sep. 14, 2012

(51) Int. Cl.
*H04L 29/06* (2006.01)

(52) U.S. Cl.
USPC .......................................... 726/22; 713/187

(58) Field of Classification Search
CPC ....... G06F 21/55; G06F 21/566; G06F 21/50; G06F 21/00
See application file for complete search history.

(56) References Cited

U.S. PATENT DOCUMENTS

| | | | |
|---|---|---|---|
| 2011/0047597 A1* | 2/2011 | Mahaffey et al. | 726/3 |
| 2012/0184248 A1* | 7/2012 | Speede | 455/411 |
| 2013/0055405 A1* | 2/2013 | Zhao et al. | 726/26 |

\* cited by examiner

*Primary Examiner* — Izunna Okeke
(74) *Attorney, Agent, or Firm* — Holland & Hart, LLP

(57) ABSTRACT

A computer-implemented method for identifying malware is described. Event data is received from a mobile device. The event data including events performed on the mobile device and a list of one or more applications. The list of the one or more applications is compared with at least one additional list of applications received from at least one additional mobile device. An application in common across the lists of applications is identified. The identification of the application in common to is transmitted to the mobile device.

14 Claims, 8 Drawing Sheets

SYSTEMS AND METHODS FOR IDENTIFYING MALWARE

BACKGROUND

The use of communication devices and communication-related technologies continues to increase at a rapid pace. This increased use of communication devices has influenced the advances made to communication-related technologies. Indeed, communication devices have increasingly become an integral part of the business world and the activities of individual consumers. Communication devices may be used to carry out several business, industry, and academic endeavors. The wide-spread use of these devices has been accelerated by the increased use of computer networks, including the Internet.

Many businesses use one or more computer networks to communicate and share data between the various devices connected to the networks. The productivity and efficiency of employees may require human and computer interaction. Users of communication technologies continue to demand an increase in the efficiency of these technologies. Improving the efficiency of communication technologies is always desirable to anyone who uses and relies on the communication devices.

Communication devices may be mobile. Users of mobile devices may communicate with others via data and voice messages. For example, short message service (SMS) messages may be transmitted/received between mobile communication devices. Further, users of these devices may communication with each other via telephone calls using these mobile communication devices.

Applications and other functionalities have become increasingly available on mobile communication devices. Malware, however, may initiate communications with other entities unbeknownst to the user. These communications may result in the user being unknowingly subscribed to premium services that include unwanted financial obligations for the user. Communications initiated by the malware may further result in a decrease of functionality and performance by the communication device.

SUMMARY

According to at least one embodiment, a computer-implemented method for identifying malware is described. Event data is received from a mobile device. The event data including events performed on the mobile device and a list of one or more applications. The list of the one or more applications is compared with at least one additional list of applications received from at least one additional mobile device. An application in common across the lists of applications is identified. The identification of the application in common to is transmitted to the mobile device.

In one example, the events performed on the mobile device comprise a transmission or reception of a short message service (SMS) message. In one configuration, the events performed on the mobile device comprise an alteration to a log of activities performed on the mobile device. In another embodiment, the events performed on the mobile device comprise a deletion of a record indicating a transmission or receipt of a short message service (SMS) message.

In one embodiment, the list of applications comprises applications that are executing within a predetermined time period the events are performed on the mobile device. The list of applications may comprise applications that are installed within a predetermined time period the events are performed on the mobile device. In one example, the list of applications may comprise applications that initiated an installation process within a predetermined time period the events are performed on the mobile device.

In one configuration, a confidence score is assigned to the identified application based in part on a number of additional mobile devices that transmitted event data. In one example, a confidence score may be assigned to the identified application based in part on a past history of behavior of the mobile device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
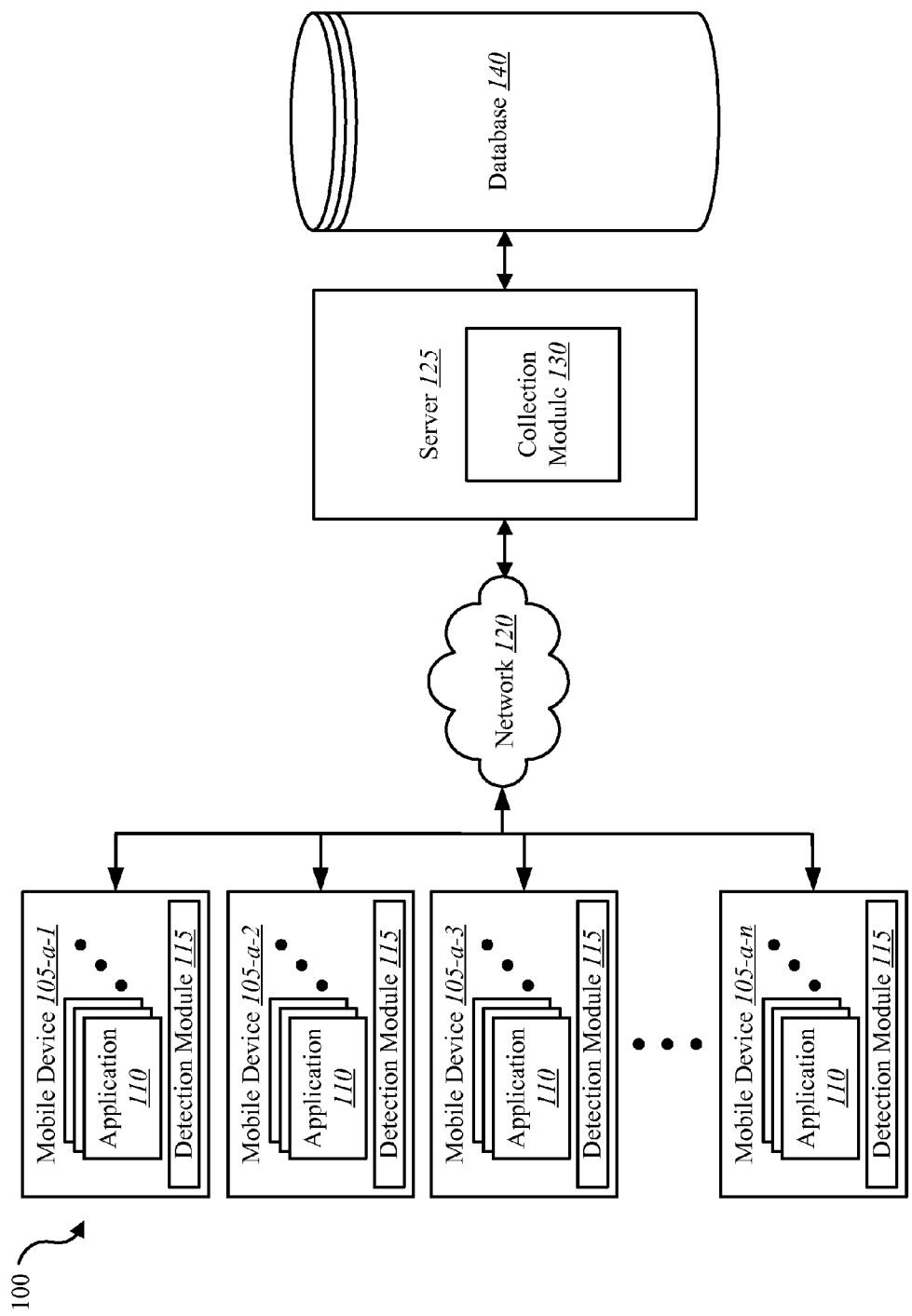
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Short messages may be used to provide premium rate services to subscribers of a telephone network. Short messages that provide premium rate services may be referred to as premium short message service (SMS) messages. Premium rate services may also be accessed via a telephone number. Telephone numbers that provide these services may be referred to as premium telephone numbers. Calls made using a premium rate telephone number and premium SMS messages are more expensive. Part of the charge is paid to the service provider, thus enabling businesses that provide the service to be funded via the calls and SMS messages. Premium rate telephone numbers and premium SMS messages may be used to provide tech support services, directory enquiries, weather forecasts, competitions and voting (e.g., relating to television programs), news alerts, financial information, logos, ring tones, etc.

In some cases, a user may exchange non-premium SMS messages with a service provider to subscribe for a premium rate service. Once the subscription process is complete, the service provider may begin sending premium SMS messages to the user's mobile phone that include the service subscribed to by the user.

While premium rate services may provide a desired service to some users, a common monetization strategy for mobile malware is the use of premium SMS messages and premium telephone calls without the knowledge and consent of the user. An operating system (OS) installed on a mobile communications device (e.g., cell phone), such as Android and iOS, does not include facilities for security software to intercept or block potentially dangerous application behaviors. For example, current OSs do not include security software to detect suspicious behavior that involves the transmission and receipt of SMS messages and the use of premium telephone numbers and then identify the application(s) likely responsible for such behavior. The present systems and methods may detect suspicious SMS and phone activities and identify the potentially malicious application(s) that most likely performed such activities.

Suspicious SMS and phone activities may include the use of premium SMS messages and premium telephone numbers. Suspicious activities may also include the deletion of SMS messages and telephone numbers from a log so quickly after they are created and/or received that it is highly unlikely that a human deleted them. For instance, when a mobile device sends a premium SMS message to a service provider; this may often result in a reply from the service provider. In one example, during installation on a mobile device, a malicious application may interact with a web form to register the mobile device for a premium rate service without the user's consent. To complete the registration, the provider of the premium rate service may send a confirmation of the registration. As a result, the service provider may send an SMS confirmation message to the mobile device to confirm the registration to the premium rate service. The SMS confirmation message may be stored in a log along with other SMS messages received by and sent from the mobile device. The malicious application may access the log to delete the confirmation message. As a result, the user remains unaware that a subscription to a premium rate service has occurred. The user may then begin to receive unwanted digital content (news updates, financial quotes, ringtones, etc.) at the mobile device along with the associated charges to his/her account.

A malicious application may perform these steps more quickly than is possible for a human. Detecting a short time frame between the act of sending or receiving a message or making a call to a premium phone number and the act of deleting the associated log entries may provide a suitable indicator of malicious behavior. Detecting this short time frame, however, may not indentify which application(s) are performing these suspicious activities. The present systems and methods may collect data relating to such activities and identify the applications that are installed or running on a mobile device at the time such activities are performed. There are likely many applications installed and running when such behavior is detected. The present systems and methods may collect data relating to the activities across multiple mobile devices. The collected data may then be used to narrow down which applications are running and/or installed on the multiple mobile device within close proximal times to the detected activities. As a result, the present systems and methods may identify the applications that are running and/or just installed that are common across multiple mobile devices to identify the potential malware that abuse premium rate services by using SMS messages and/or phone call activities.

Turning now to the Figures, FIG. 1 is a block diagram illustrating one embodiment of an environment 100 in which the present systems and methods may be implemented. In one example, a plurality of mobile devices 105 may communicate with a server 125 across a network 120. The mobile device 105 may be a cell phone, a smartphone, a personal digital assistant (PDA), or any other type of mobile communications device. The network 120 may be a wireless wide area network (WAN), a local area network (LAN), etc.

In one embodiment, each mobile device 105 may execute or install one or more applications 110. In some examples, an application 110 may be malware. If the application is malware, suspicious activities may occur during installation and/or execution of the application 110. In one configuration, each mobile device 105 may include a detection module 115. The detection module may detect suspicious activities that occur on the mobile devices 105. For example, the detection module may detect when a type of SMS message is sent from and received by the mobile device 105 as well as when phone calls are made by or received at the mobile device 105 using premium telephone numbers, etc. The detection module 115 may further detect when a log of activities on the mobile device 105 is altered. For example, the module 115 may detect when a log entry indicating the receipt or transmission of an SMS message is altered (e.g., deleted). In one embodiment, the detection module 115 may communicate event data that describes the detected activities to the server 125 across the network 120.

In one example, the server 125 may include a collection module 130. The module 130 may collect event data received from the plurality of mobile devices 105 that describe suspicious activities detected by the various detection modules 115. The event data may be stored in a database 140. The collection module 130 may analyze the event data to identify one or more applications 110 in common among the of mobile devices 105 that were running and/or were engaged in an installation process in close proximity to the time the event data was detected on the mobile devices 105. An identified application that was running and/or being installed on the plurality of mobile devices 105 at the time the event data was detected on each of the devices 105 may be the application that is responsible for performing the suspicious activities. The collection module 130 may provide a notification to the mobile devices 105 regarding the identity of the application 110.

Figure 2:
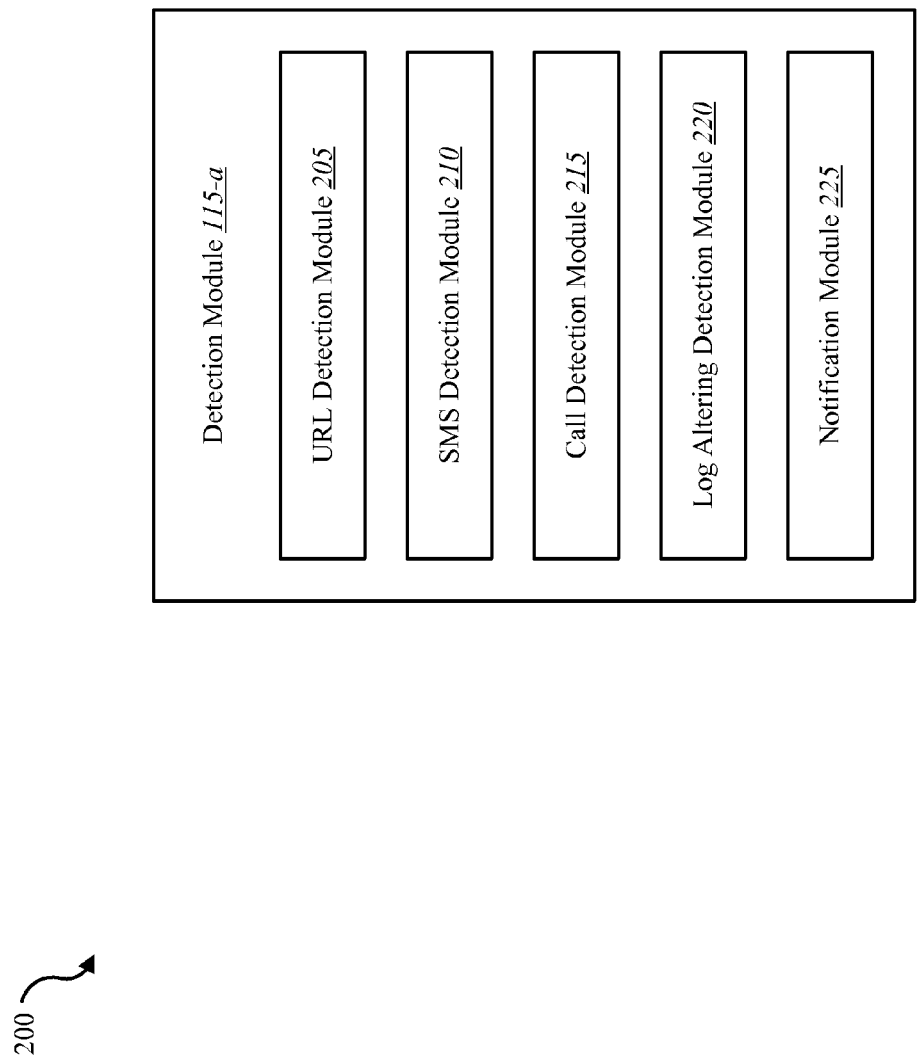
FIG. 2 is a block diagram illustrating one embodiment of a detection module.

FIG. 2 is a block diagram 200 illustrating one embodiment of a detection module 115-*a*. In one configuration, the detection module 115-*a* may be an example of the detection module 115 illustrated in FIG. 1. In one embodiment, the detection module 115-*a* may include a uniform resource locator (URL) detection module 205, an SMS detection module 210, a call detection module 215, a log altering detection module 220, and a notification module 225.

In one example, the URL detection module 205 may detect when a suspicious URL is accessed by the mobile device 105. For example, the URL detection module 205 may detect when a URL is accessed that includes a web form. The web form may include data fields, inviting a user to input information such as a telephone number and other personal information.

The SMS detection module 210 may detect when an SMS message is sent from or received by a mobile device 105. The SMS detection module 210 may detect SMS message that are either sent or received within a certain time period after an application begins executing or after an application is installed on the mobile device 105. In one example, the SMS detection module 210 may detect when premium SMS messages are sent and/or received. Further, the module 210 may detect when SMS messages are sent and/or received when the past actions of the mobile device 105 have not included the transmission and/or reception of SMS messages.

In one embodiment, the call detection module 215 may detect when phone calls originate from a mobile device 105. For example, the module 215 may detect when premium telephone numbers are used to place a call from the mobile device 105. The call detection module 215 may detect calls that are placed by the mobile device 105 within a certain time frame following the installation of an application and/or the initiation of the execution of an application.

The log altering detection module 220 may detect when a log of activities maintained by the mobile device 105 has been altered. For example, the log altering detection module 220 may detect when a log entry indicating an SMS message was sent by the mobile device 105 is deleted from the log of activities. The detection module 220 may further detect when an SMS message received by the mobile device 105 is deleted from the log of activities. The log altering detection module 220 may detect such deletions that occur within a certain time frame. For example, the module 220 may detect deletions of SMS messages that occur within a certain time period following the initiation of an installation of an application, the initiation of the execution of an application, etc. Further, the log altering detection module 220 may detect deletions of received SMS messages that occur within a certain time period following receipt of the message. For example, behavior may be detected when an SMS messages is received and then immediately deleted upon reception.

The notification module 225 may generate a notification that includes event data. The event data may be a list, summary, or other type of report that includes the suspicious activities detected by the other modules of the detection module 115-*a*. The event data may also include a timestamp or other timing indicator to indicate when the detected activities took place. The event data may further include a report that identifies the applications that were running on the mobile device 105 when (or shortly before or after) such activities were detected. Further, the event data may identify the applications that had begun to be installed when the activities were detected as well as applications that had recently finished the installation process. The notification that includes the event data may be transmitted to the server 125.

Figure 3:
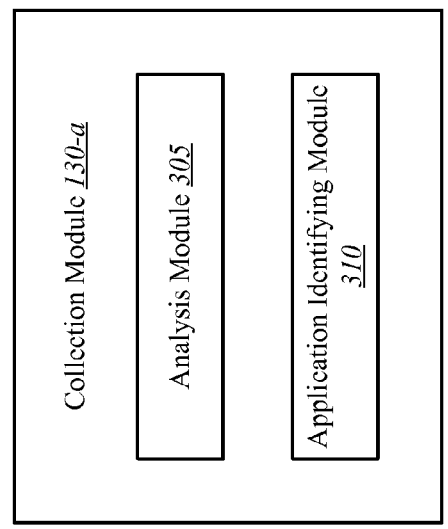
FIG. 3 is a block diagram illustrating one embodiment of a collection module.

FIG. 3 is a block diagram 300 illustrating one embodiment of a collection module 130-*a*. The collection module 130-*a* may be an example of the collection module 130 illustrated in FIG. 1. The collection module 130-*a* may include an analysis module 305 and an application identified module 310.

In one embodiment, the analysis module 305 may analyze event data received from a multitude of mobile devices 105. For example, the module 305 may organize the event data received from multiple mobile devices 105 to identify pattern of events that occurred among the mobile devices 105. In one configuration, the event data may already be organized when it is received at the server 125.

Based on the analysis, the application identifying module 310 may identify an application on the mobile devices 105 that may be responsible for performing the suspicious activities. In one example, the module 310 may analyze the lists of applications included in the event data from each of the multiple mobile devices 105. The lists may include applications that were executing, were being installed, or were recently installed in close proximity of time to when the suspicious activities were detected on each mobile device 105. The module 310 may identify the application(s) that are in common among the various lists. As a result, the application identifying module 310 may identify the application(s) that were executing, being installed, etc. on each of the mobile (or a certain threshold number of mobile devices 105) at the time the suspicious activities were detected on each device 105.

As an example, suspicious activities may be detected on a first mobile device 105-*a*-1 at a first time period. During this first time period, applications A, B, and C were executing on the first mobile device 105-*a*-1. Event data that includes the detected activities as well as the identity of the applications may be transmitted to the server 125. Suspicious activities may be detected on a second mobile device 105-*a*-2 at a second time period that is different from the first time period. During the second time period, applications A, D, and E were executing on the second mobile device 105-*a*-2. Event data that includes the activities detected on the second mobile device 105-*a*-2 as well as the identity of the applications may be transmitted to the server 125. Event data may continue to be collected from a multiple of mobile devices 105.

In one embodiment, the application identifying module 310 may use the received event data to identify the application(s) that was common among a certain number of mobile devices 105 when the suspicious activities were detected on each device. In this example, the module 310 may identify application A as being the application that may be responsible for performing the activities. The application identifying module 310 may generate a notification to transmit to the mobile devices 105 providing the identity of the application.

The module 310 may further include a confidence score with the identified application depending on the number of mobile devices that provided event data. For example, a confidence score may be higher for an application when a high number of mobile devices 105 send event data. When a lower number of mobile devices 105 submit event data, the confidence score may be lower.

In one embodiment, the confidence score may be based on the past events performed on the mobile device. For example, if a certain number of SMS messages have not been sent/received by the mobile device 105 in the past, the confidence score for an identified application that may be responsible for sending/receiving the SMS messages may be higher even if the number of mobile devices that submitted event data is low.

Figure 4:
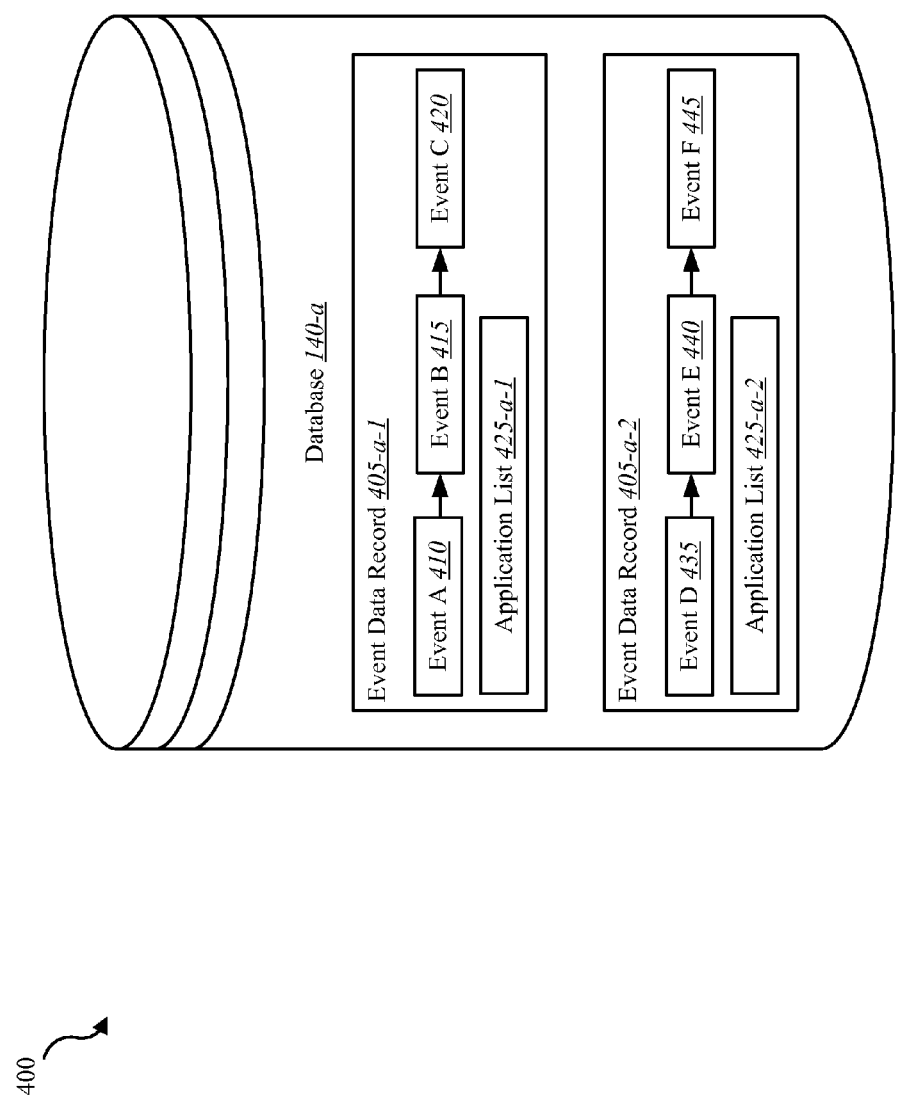
FIG. 4 is a block diagram illustrating one embodiment of a database in accordance with the present systems and methods.

FIG. 4 is a block diagram 400 illustrating one embodiment of a database 140-*a* in accordance with the present systems and methods. The database 140-*a* may be an example of the database 140 illustrated in FIG. 1.

In one example, the database 140-*a* may include one or more event data records 405. Each record 405 may include events or activities detected by one or more mobile devices 105. For example, a first event data record 405-*a*-1 may include event A 410, event B 415, and event C 420. A second event data record 430 may include event D 435, event E 440, and event F 445. While only three events are listed in each record, it is to be understood that more or less than three events may be included in an event data record.

When a mobile device 105 detects suspicious activities and transmits the detection of such activities to the server 125, the analysis module 305 may analyze the detected events to determine which event data record includes similar activities detected from other mobile devices 105. Each event data record 405 may also include an application list 425 that includes a list of applications that were executing, were being installed, etc. on the various mobile devices 105 during (or in close proximity to) the time the events were detected on the mobile devices 105. When a certain number of mobile devices 105 report that suspicious activities have been detected, the applications in the application list 425 may be analyzed to identify an application that is common among a certain number of mobile devices 105 that reported the suspicious activities.

Figure 5:
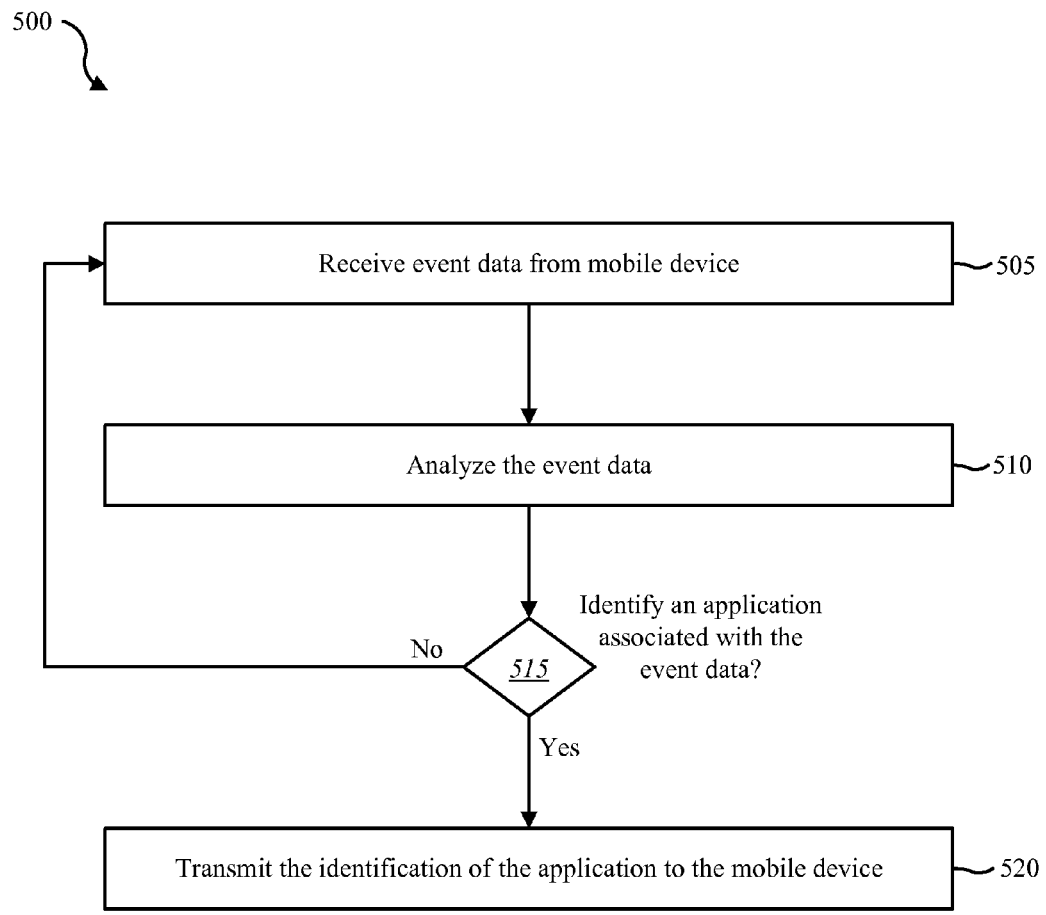
FIG. 5 is a flow diagram illustrating one embodiment of a method for identifying an application performing suspicious act.

FIG. 5 is a flow diagram illustrating one embodiment of a method 500 for identifying an application performing suspicious activities. In one configuration, the method 500 may be implemented by a server 125. In particular, the method 500 may be implemented by the collection module 130 executing on the server 125.

At block 505, event data may be received from a mobile device. The event data may include suspicious behavior performed on the mobile device. The received event data may further include a list of applications that were running (or were recently installed) close to the time that the suspicious behavior was performed. The event data may be stored in a database 140 with event data received from a plurality of mobile devices.

At block 510, the event data may be analyzed. For example, the data may be analyzed to identify if the suspicious behavior included in the event data has been received from a certain number of mobile devices. The suspicious behavior may include the sending/receiving of premium SMS messages, the deletion of received SMS messages within a certain time period after the SMS was received, the origination of a telephone call using a premium telephone number, and the like. At block 515, a determination may be made as to whether an application associated with the event data is identified. In one example, the event data received from the plurality of mobile deices may be analyzed to identify common applications listed in the plurality of event data received from the various devices. If a common application does not exist among the event data, it may be determined that no application is identified and the method 500 may return to receive event data from a mobile device. If, however, a common application (or applications) exists among the various event data, the common application may be identified as being associated with the event data. For example, the common application may be identified as the application that may have performed or initiated the suspicious behavior that was performed on the plurality of mobile devices.

In one configuration, the identification of the common application(s) may be transmitted to the mobile device, at block 520. The identification may also be transmitted to each of the additional mobile devices that sent event data to the server 125 that included similar occurrences of the suspicious activities.

Thus, the method 500 may provide for efficient ways to identify applications that may be responsible for suspicious behavior, such as an abuse of premium SMS services, on a mobile device 105. It should be noted that the method 500 is just one implementation and that the operations of the method 500 may be rearranged or otherwise modified such that other implementations are possible.

Figure 6:
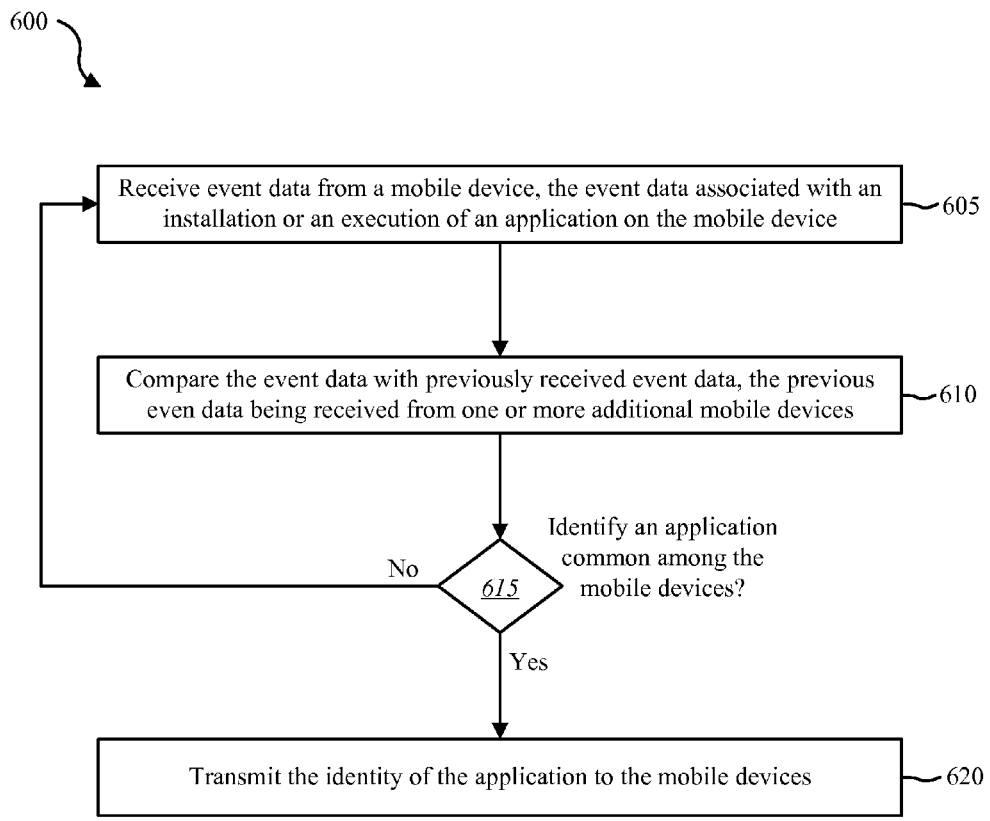
FIG. 6 is a flow diagram illustrating one embodiment of a method to further identify malware on a mobile device.

FIG. 6 is a flow diagram illustrating one embodiment of a method 600 to further identify malware on a mobile device. The method 600 may be implemented by the server 125. And in particular, the method 600 may be implemented by the collection module 130.

At block 605, event data may be received from a mobile device. The event data may be associated with the installation or an execution of an application on a mobile device. For example, the event data may include a list of activities that may include the sending and/or receiving of an SMS message, the sending and/or receiving of a telephone call, access of a web form, and the like. The event data may be associated with applications that were executing, were being installed, etc. within a certain time period that the activities of the event data were detected. The event data may also include a list identifying the applications that have been associated with the event data.

At block 610, the event data may be compared with previously received event data. The previously received event data may have been received from one or more additional mobile devices. The event data may also be compared with event data that is subsequently received from additional mobile devices. In one example, the list of applications in the currently received event data may be compared with the list of applications included with the previously received instances of event data. At block 615, a determination may be made as to whether the lists of applications included in the various instances of event data include a common application. If it is determined 615 that no common applications exists within the various lists, the method 600 may return to receive event data from a mobile device. If, however, it is determined that an application is in common, the identity of the application may be transmitted to the mobile devices at block 620.

Therefore, the method 600 may provide for ways to detect malware installed or executing on a mobile device by identifying applications in common across a plurality of mobile devices that were executing, being installed, etc. close to the time suspicious activities were also detected on each of the mobile devices. It should be noted that the method 600 is just one implementation and that the operations of the method 600 may be rearranged or otherwise modified such that other implementations are possible.

Figure 7:
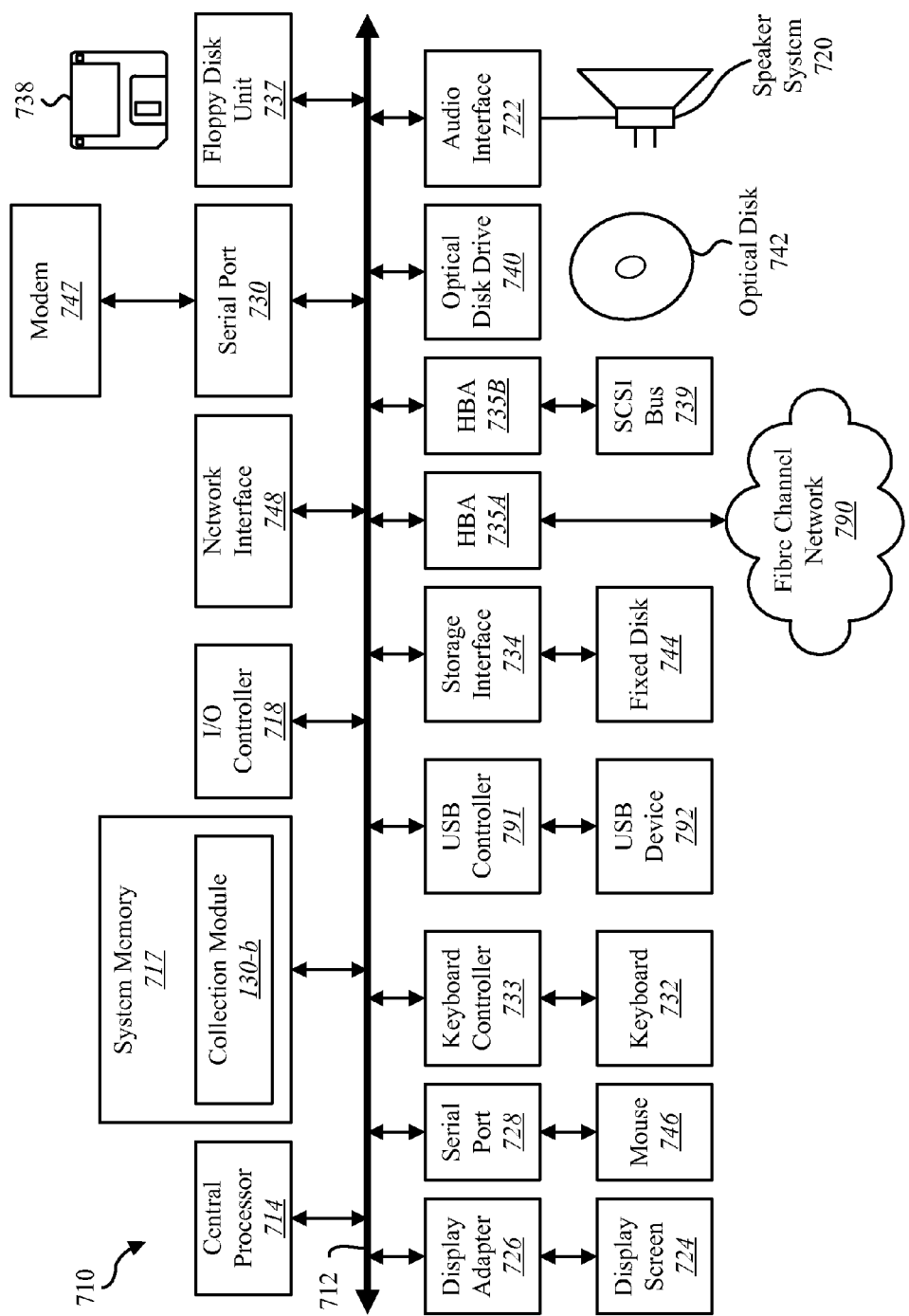
FIG. 7 depicts a block diagram of a computer system suitable for implementing the present systems and methods.

FIG. 7 depicts a block diagram of a computer system 710 suitable for implementing the present systems and methods. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), multiple USB devices 792 (interfaced with a USB controller 791), a storage interface 734, a floppy disk unit 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a collection module 130-*b* to implement the present systems and methods may be stored within the system memory 717. The collection module 130-*b* may be an example of the collection module 130 of FIGS. 1 and/or 3. Applications resident with computer system 710 are generally stored on and accessed via a non-transitory computer readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in a non-transitory computer-readable medium such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
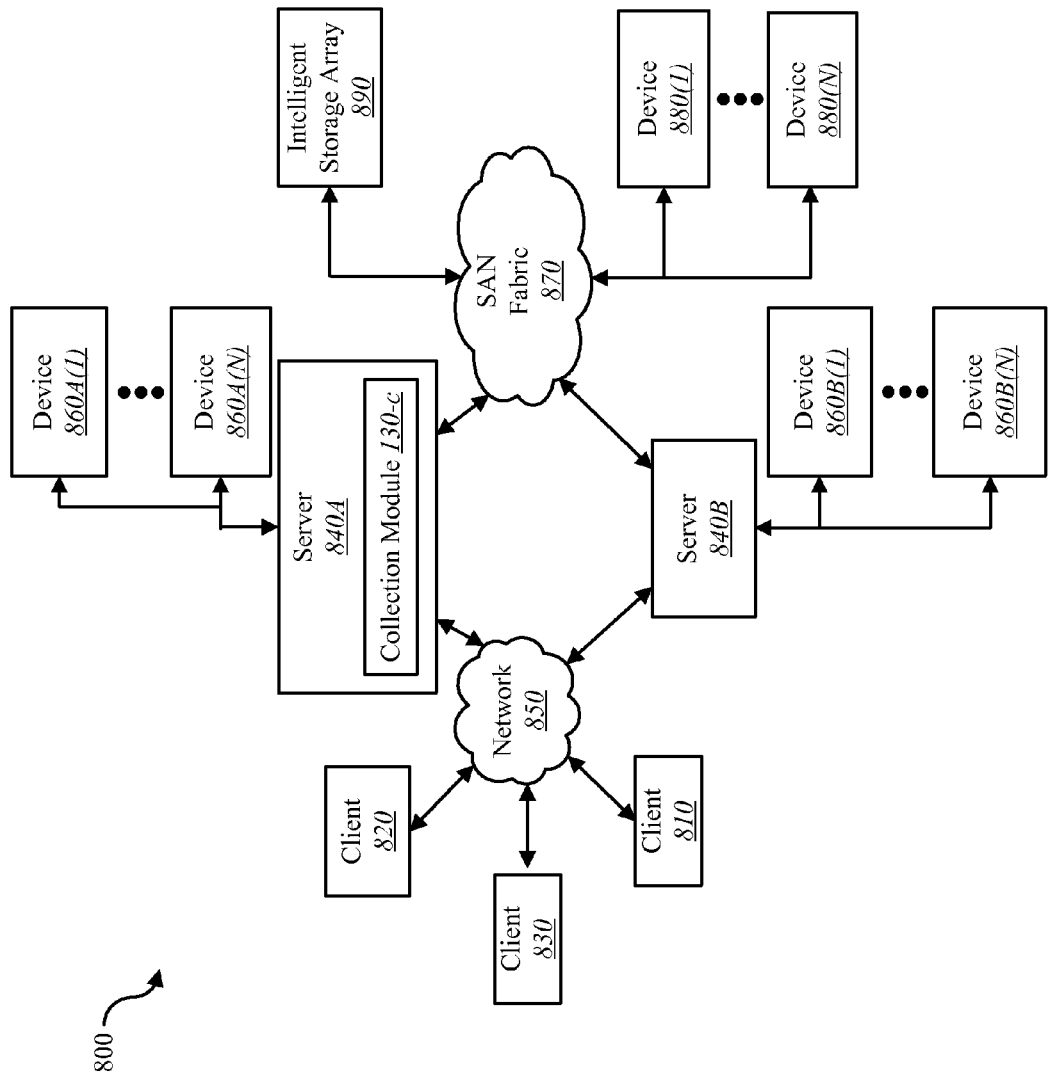
FIG. 8 is a block diagram depicting a network architecture in which client systems, as well as storage servers (any of which can be implemented using computer system), are coupled to a network.

FIG. 8 is a block diagram depicting a network architecture 800 in which client systems 810, 820 and 830, as well as storage servers 840A, 840B (any of which can be implemented using computer system 810), are coupled to a network 850. In one embodiment, a collection module 130-*c* may be located within the storage servers 840A, 840B to implement the present systems and methods. The collection module 130-*c* may be an example of the collection module 130 of FIGS. 1, 3, and/or 7. The storage server 840A is further depicted as having storage devices 860A(1)-(N) directly attached, and storage server 840B is depicted with storage devices 860B(1)-(N) directly attached. SAN fabric 870 supports access to storage devices 880(1)-(N) by storage servers 840A, 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820, and 830 to network 850. Client systems 810, 820, and 830 are able to access information on storage server 840A or 840B using, for example, a web browser or other client software (not shown). Such a client allows client systems 810, 820, and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for identifying malware, comprising:
    receiving event data from a first mobile device, the event data from the first mobile device comprising events performed on the first mobile device and a list of one or more applications executing when the events on the first mobile device are performed, wherein the events performed on the first mobile device comprise a deletion of a first record indicating a transmission or receipt of a first short message service (SMS) message at the first mobile device, and wherein the list of applications comprise applications that initiated an installation process within a predetermined time period before the events are performed on the first mobile device;
    receiving event data from a second mobile device, the event data from the second mobile device comprising events performed on the second mobile device and a list of one or more applications executing when the events on the second mobile device are performed, wherein the events performed on the second mobile device comprise a deletion of a second record indicating a transmission or receipt of a SMS message at the second mobile device;
    comparing the list of the one or more applications received from the first mobile device with the list of the one or more applications received from the second mobile device;
    determining whether deletion of the first record and the second record occurs upon transmission or receipt of each respective SMS message;
    upon determining deletion of the first record and the second record occurs upon transmission or receipt of each respective SMS message, identifying an application in common across the lists of applications; and
    transmitting the identification of the application in common to the first mobile device.

2. The method of claim 1, wherein the events performed on the first mobile device comprise a transmission or reception of a SMS message.

3. The method of claim 1, wherein the events performed on the mobile device comprise an alteration to a log of activities performed on the first mobile device.

4. The method of claim 1, wherein the list of applications comprises applications that are installed within a predetermined time period before the events are performed on the first mobile device.

5. The method of claim 1, further comprising assigning a confidence score to the identified application based in part on a number of additional mobile devices that transmitted event data.

6. The method of claim 1, further comprising assigning a confidence score to the identified application based in part on a past history of behavior of the first mobile device.

7. A computing device configured to identify malware, comprising:
    a processor;
    memory in electronic communication with the processor; instructions stored in the memory, the instructions being executable by a processor to:
        receive event data from a first mobile device, the event data from the first mobile device comprising events performed on the first mobile device and a list of one or more applications executing when the events on the first mobile device are performed, wherein the events performed on the first mobile device comprise a deletion of a first record indicating a transmission or receipt of a first short message service (SMS) message at the first mobile device, and wherein the list of applications comprise applications that initiated an installation process within a predetermined time period before the events are performed on the first mobile device;
        receive event data from a second mobile device, the event data from the second mobile device comprising events performed on the second mobile device and a list of one or more applications executing when the events on the second mobile device are performed, wherein the events performed on the second mobile device comprise a deletion of a second record indicating a transmission or receipt of a SMS message at the second mobile device;
        compare the list of the one or more applications received from the first mobile device with the list of the one or more applications received from the second mobile device;
        determine whether deletion of the first record and the second record occurs upon transmission or receipt of each respective SMS message;
        upon determining deletion of the first record and the second record occurs upon transmission or receipt of each respective SMS message, identify an application in common across the lists of applications; and
        transmit the identification of the application in common to the first mobile device.

8. The computing device of claim 7, wherein the events performed on the first mobile device comprise a transmission or reception of a message.

9. The computing device of claim 7, wherein the events performed on the first mobile device comprise an alteration to a log of activities performed on the mobile device.

10. The computing device of claim 7, wherein the list of applications comprises applications that are installed within a predetermined time period before the events are performed on the first mobile device.

11. The computing device of claim 7, wherein the instructions are further executable by the processor to assign a confidence score to the identified application based in part on a number of additional mobile devices that transmitted event data.

12. The computing device of claim 7, wherein the instructions are further executable by the processor to assign a confidence score to the identified application based in part on a past history of behavior of the first mobile device.

13. A computer-program product for identifying malware, the computer-program product comprising a non-transitory computer-readable medium having instructions thereon, the instructions being executable by a processor to:
    receive event data from a first mobile device, the event data from the first mobile device comprising events performed on the first mobile device and a list of one or more applications executing when the events on the first mobile device are performed, wherein the events performed on the first mobile device comprise a deletion of a first record indicating a transmission or receipt of a first short message service (SMS) message at the first mobile device, and wherein the list of applications comprise applications that initiated an installation process within a predetermined time period before the events are performed on the first mobile device;

receive event data from a second mobile device, the event data from the second mobile device comprising events performed on the second mobile device and a list of one or more applications executing when the events on the second mobile device are performed, wherein the events performed on the second mobile device comprise a deletion of a second record indicating a transmission or receipt of a SMS message at the second mobile device;

compare the list of the one or more applications received from the first mobile device with the list of the one or more applications received from the second mobile device;

determine whether deletion of the first record and the second record occurs upon transmission or receipt of each respective SMS message;

upon determining deletion of the first record and the second record occurs upon transmission or receipt of each respective SMS message, identify an application in common across the lists of applications; and transmit the identification of the application in common to the first mobile device.

14. The computer-program product of claim 13, wherein the events performed on the first mobile device comprise a transmission or reception of a SMS message.

* * * * *